3,378,630
PRESSURE SENSITIVE THERMOSETTING RESINOUS ADHESIVES AND TAPES

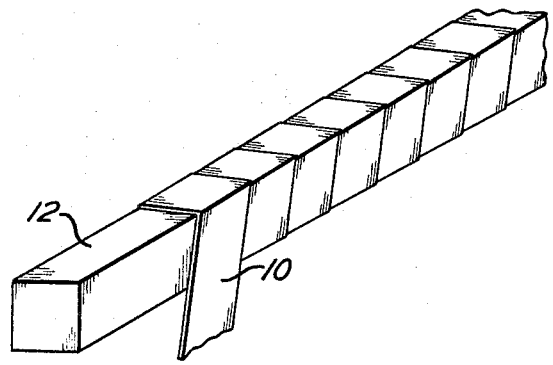

Morris A. Mendelsohn and Dow A. Rogers, Jr., Pittsburgh, Pa., assignors to Westinghouse Electric Corporation, East Pittsburgh, Pa., a corporation of Pennsylvania
Filed Jan. 27, 1964, Ser. No. 340,278
11 Claims. (Cl. 174—121)

ABSTRACT OF THE DISCLOSURE

A thermosetting pressure sensitive adhesive is made from a saturated polyester resin and small amounts of melamine-formaldehyde resin, epoxy resin, flexibilizer and anti-oxidant. Mineral fillers, in finely divided form, may be included. The saturated polyester resin is derived from a trihydric polyol, a hydroxy derivative of benzoic acid, a natural oil and an aromatic dicarboxylic acid, in specified proportions. The adhesive can be applied to fibrous backing to provide a pressure sensitive tape that can be cured to a thermoset state with excellent electrical insulating properties.

---

This invention relates to pressure sensitive thermosetting adhesives and adhesive tapes, and in particular it concerns electrical insulation tapes which are of exceptional high thermal stability.

Commercially available pressure sensitive tapes are of two general types. The first employs thermoplastic films, particularly those based on polyvinyl chloride and copolymers of vinyl chloride with other monomers. Vinyl backed adhesive tapes have certain thermal limitations, however, due to the thermoplastic character of the polymer backing and also to the thermal degradation characteristics of vinyl compounds when exposed to elevated temperatures for long periods of time. In general such tapes are unusable at temperatures greater than 100° C.

The second type of commercially available tape for insulation purposes is pressure sensitive thermosetting silicone rubber tape. Although this type has excellent thermal stability characteristics, it too has many restricting limitations among which are high cost, poor cut-through strength, poor solvent resistance, and it is not safely usable in DC equipment.

It is therefore an object of the present invention to provide a pressure sensitive thermosetting adhesive and tape including the adhesive that can be used for electrical insulation purposes and which is characterized by excellent conformability, is self-sealing upon the application of heat, is of low cost, can be used for long periods of time at very high temperatures, has good electric strength, excellent chemical and moisture resistance.

Another object of the invention is to provide cable, such as lead cable, insulated with pressure sensitive adhesive, of the foregoing object.

Other objects will be apparent from time to time in the following detailed description and discussion.

These and other objects are attained in accordance with the present invention with an adhesive composition comprised generally of a saturated polyester resin, a melamine-formaldehyde resin, an ethoxyline resin, a high molecular weight hydroxy reactive flexibilizer and an antioxidant, and a solvent and mineral fillers if desired. The resulting product is a thermosetting pressure sensitive adhesive that has good storage life, cures at a good rate in thick sections, and is otherwise of outstanding usefulness for insulating applications and yet is of modest cost.

The saturated polyester base material for the present invention is made from a composition that includes at least one low molecular weight polyol such as a trihydric aliphatic organic compound, at least one low molecular weight aromatic organic compound containing two functional groups such as OH and SOOH, a natural oil such as dehydrated castor oil and an aromatic dicarboxylic acid. By saturated we mean to indicate the absence of olefinic unsaturation except for the small amount in the oil; aromatic unsaturation is not reactive and is not considered. These materials are reacted with one another in ratios that result in some functional groups remaining for later reaction, and the resulting resin is then combined with the other components as shown in detail hereinafter.

The trihydric aliphatic compound used in making the polyester is saturated and contains from 3 to 7 carbon atoms. Typical of the materials that can be used are propanetriol, butanetriol, trimethylolethane, and the like with glycerol being preferred. While the amount of the trihydric compound used is dependent on the quantity of the other materials present, generally it constitutes about 15 to 30 weight percent of the reactive components employed to make the saturated polyester.

The difunctional aromatic compound is used in an amount of 15 to 25 weight percent. Salicylic acid or other hydroxy derivative of benzoic acid containing 7 to 9 carbon atoms per molecule may be used. Other components employed to form the polyester include an aromatic dicarboxylic acid and a natural oil. Dehydrated castor oil and soybean oil constitute the preferred oils that can be used and these normally are present in an amount of about 25 to 40 percent of the total reactive components employed in preparing the polyester. Isophthalic acid, phthalic acid, terephthalic acid and other dicarboxylic acid derivatives of benzene having 8 to 12 carbon atoms per molecule constitute the aromatic acid component for this reaction. This acid suitably comprises 25 to 40 weight percent of the total.

In addition to the foregoing, various reaction initiators, accelerators, catalysts and the like can be used in the conventional small amounts if desired. Suitably, the dehydrated oil and part of the aliphatic polyol compound are first mixed and reacted, preferably with a small amount of a reaction initiator such, for example, as an alkaline earth hydroxide, e.g. 0.01 to 0.5 part of calcium hydroxide. Reaction occurs in about ½ to 2 or more hours at an elevated temperature of about 150° to 300° C., while agitating. Then the remaining components are added along with a catalyst, such as a lower alkyl titanate, e.g. 0.1 to 1 part of isopropyl titanate. A reaction medium such as xylene or other organic solvent suitably is included and reaction is continued for about 2 to 10 or more hours at a temperature of about 150° to 300° C. The reaction mixture is agitated and azeotropic distillation may be practiced.

The polyester generally comprises about 65 to 85 weight percent of the overall resin mixture, on a solvent-free and filler-free basis. In addition, and on the same basis, there are included about 3 to 10 weight percent of an ethoxyline resin, about 3 to 8 weight percent of a melamine-formaldehyde resin, about 3 to 7 weight percent of oil extenders such as castor oil and one to 4 weight percent of an oxidation inhibitor. The castor oil serves to provide flexibility in the resulting product. Other long chain flexibilizers can also be used, and they should have some reactive end groups to provide chemical bonding. Pine oil can be included but is not essential; it gives desirable rheological properties for application of the resin to a substrate. All of these components are commercially available. A suitable melamine-formaldehyde resin, which acts as a cross-linking agent during a final cure, is a butylated melamine-formaldehyde resin. A typical product that can be used is obtained by reacting melamine with formaldehyde in a ratio of about 5 to 6 mols of formaldehyde per mol of melamine followed by butylization with butyl alcohol. An excess of butanol can be used, and it is suitably activated slightly, as with mineral acid, to speed the reaction. In the reaction product, generally about 1 to 2 mols of butanol are present per mol of melamine.

The ethoxyline or epoxy resin is also used as a crosslinking agent and this too is commercially available and properties and methods of manufacture of such materials are universally available in the published technical literature. However, in general, these materials are prepared by reacting a polyhydric phenol and an epihalohydrin. For example, bisphenol A can be reacted with excess epichlorohydrin to obtain a liquid resin. Commonly, an aqueous alkaline reaction medium is used and there results a resinous polymeric epoxide including one or more hydroxyl groups per molecule and an average of more than one but not greater than two epoxy groups per molecule. Reaction normally is carried out at a temperature on the order of 50° to 100° C. for one or more hours. The ethoxyline resins used in the present invention generally have an epoxide equivalent weight of about 180 to 2000, and an average molecular weight of about 350 to 3000. Other cross-linking epoxides or other resins can be employed also.

Typical of the oil extenders employed as flexibilizers are castor oil, soybean oil and like natural oils. Thermosetting of the composition is achieved by a combination of ionic and free radical mechanisms operative upon exposure to heat and air or other molecular oxygen. Consequently an antioxidant is included that functions to temporarily interrupt radical chains and to increase the induction period, and thereby prolong the useful life of the composition in the non-cured state.

Conventional mineral fillers, pigments and the like as well as mixtures thereof can also be included to reduce overall expense and to impart additional thermal stability. Iron oxide, magnesium oxide, alumina, silica, carbon black, calcium carbonate, talc and like materials are suitable for this purpose and generally are included in amounts, based on the solids content of the resulting mixture of about 20 to 40 weight percent. These materials are used in finely divided form, for example all of about minus 100 mesh size (Tyler) or smaller.

Many of the foregoing components are most readily handled as a solution, and accordingly solvents are thereby introduced. Additional solvent, such as xylene, toluene, etc. may be included to facilitate mixing of the various components and subsequent application. The adhesive suitably is prepared by mixing the various components in a ball mill or like device for an extended period at ambient temperature.

The adhesives of the present invention are applied to backing or supporting members or tapes, and the resultant tape is then used in electrical applications. One of the advantages of the invention is the high temperatures at which the adhesive successfully can be used. Consequently, the backing member or tape used must be able to withstand the operating temperatures contemplated. Tape of about 1 to 20 mils in thickness composed of glass fibers or mixtures of glass fibers and Dacron have been employed successfully. The tape is coated by immersion, painting or like methods followed by heating at moderate temperatures to aid solvent evaporation.

In the attached drawing, the figure is a perspective view of a lead cable insulated with a pressure sensitive adhesive of the invention. In applying the adhesive, the adhesive tape 10 is wound about the cable 12 usually by half-lapping successive turns. The cable 12 may be a lead cable, a copper conductor or other member and may be of circular or rectangular cross-section. A plurality of layers of turns can be employed if desired. Thereafter the adhesive is cured by heating at a temperature of about 130° to 200° C. for 2 to 10 hours or more. Among other desirable properties of the resulting adhesive is its flexibility, and accordingly the cured insulated conductor can be handled without destruction of the insulation.

The invention will be described further in conjunction with the following specific examples in which the details are given by way of illustration and not by way of limitation.

*Example I*

The saturated polyester resin was prepared as follows: A mixture, by weight, of 34.2 parts of dehydrated castor oil, 10.7 parts of glycerol, and 0.035 part of calcium hydroxide, was charged into a reaction vessel and heated at 240° C. for 1.5 hours while being agitated and sparging with nitrogen. Then, 12.3 parts glycerol, 21.4 parts salicylic acid, 32.2 parts isophthalic acid, 0.5 part isopropyl titanate, and about 20 parts of xylene were added to the reaction mass and the mixture was processed azeotropically, using continuous decanting to separate water of reaction and to return refluxing xylene to the vessel, for approximately 4.5 hours at a temperature in the range of 200° to 235° C. with nitrogen sparging and rapid agitation. The reaction is concluded when the control viscosity of a 50 weight percent solution of the polyester in xylene measures S–T, Gardner-Holdt. At this point toluene is added to the resulting alkyd to give a solution containing 67 weight percent of non-volatiles.

An insulation coating for tape was prepared as in the following two examples.

*Example II*

There were charged to a ball mill 43.80 parts of the resin solution of Example I, 2.25 parts of iron oxide pigment, 11.40 parts powdered talc, and 2.40 parts of a 50 percent solution of polymerized trimethyl dihydroquinoline in xylene, the resin having a specific gravity of 1.08 and a melting point range of 100° to 120° C. (Agerite D resin, Vanderbilt Chemical Co.). In addition 1.20 parts pine oil and 23.70 parts xylene were included, and this was milled 16 hours. Next, 3.39 parts of a liquid aromatic epichlorohydrin/bisphenol-A type epoxy resin having a viscosity of about 10,000 to 20,000 centipoises at 73° F. and a hydroxyl equivalent weight of 85 (Epon 828, Shell Chemical Co.), 2.02 parts of castor oil, and 3.05 parts of a 65 percent solution of butylated malamine-formaldehyde resin in xylene and having an acid No. of −1, a viscosity of Z–Z4 and a mineral spirits tolerance of 0.4–2.0 (Resimene 882, Monsanto) were added and ball milled for an additional 15 minutes.

A second and outstanding resin is made from the procedure, materials and amounts just stated except only one-half as much xylene is used.

*Example III*

Woven fiber glass tape, measuring 14 x 0.75 x 0.007 inches, was then treated with the resulting material of Example II. The fabric was dip-coated and the solvent evaporated at temperatures of 100° to 125° C. The process was then repeated with the resultant tape measuring 11 mils. The final tape was slightly tacky and exhibited excellent pressure sensitive properties as evidenced by good adhesion to itself and to copper.

*Example IV*

Rectangular copper bars measuring 6 x ⅜ x ⅝ inches were then insulated with a single half-lapped layer of the tape of Example III and cured 5 hours at 150° C. The tape showed excellent conformability to the square corners without gapping and the cured insulation was extremely dense and free from voids. The insulated bars had an electric strength of 10 kv. (60 cycle, root means square straight rise at 0.5 kv./sec.). After being immersed in boiling water for 72 hours, duplicate test bars were again electrically tested and found to have an electric strength of 8 kv., which indicates excellent hydrolytic stability.

Numerous other examples were made in which a wide variety of fillers were used with complete success. Tapes prepared therefrom and subsequently applied to copper and lead conductors had characteristic breakdown strengths of 8 to 12 kv. even after immersion in boiling water for three days. It is thereby evident that the adhesive provides very effective high temperature insulation at low cost. Tests have shown that this invention will find use in class F applications, that is successfully insulate for at least 10 years at temperatures on the order of 155° F.

While the invention has been described with respect to specific materials and other details, it should be evident that changes can be made without departing from its scope.

We claim:

1. A thermosettable, pressure-sensitive resinous adhesive composition comprising a solution of (1) 65 to 85 percent of a partially cross-linked saturated polyester resinous material comprising the reaction product of (a) 15 to 30 percent of at least one trihydric saturated aliphatic organic compound containing 3 to 7 carbon atoms per molecule, (b) 15 to 25 weight percent of a hydroxy derivative of benzoic acid, (c) 25 to 40 weight percent of a dehydrated natural oil, and (d) 25 to 40 weight percent of an aromatic dicarboxylic acid, (2) 3 to 8 percent of a butylated melamine-formaldehyde resin, (3) 3 to 10 percent of an epihalohydrin-polyhydric phenol epoxy resin, (4) 3 to 7 percent of a high molecular weight hydroxy reactive natural oil flexibilizer and (5) 1 to 4 percent of an antioxidant operative to prevent oxidation of the natural oil flexibilizer.

2. The resinous adhesive composition of claim 1 in combination with about 20 to 40 percent of a finely divided mineral filler, based on the solids content of the combination.

3. The resinous adhesive composition of claim 1 wherein the natural oil flexibilizer is selected from the group of oils consisting of castor oil and soybean oil and the antioxidant is polymerized trimethyl dihydroquinoline.

4. The resinous adhesive composition of claim 1 wherein the trihydric saturated aliphatic compound is glycerol, the hydroxy derivative of benzoic acid is salicylic acid, the dehydrated natural oil is castor oil and the aromatic dicarboxylic acid is isophthalic acid.

5. The resinous adhesive composition of claim 4 wherein the natural oil flexibilizer is selected from the group of oils consisting of castor oil and soybean oil and the antioxidant is polymerized trimethyl dihydroquinoline.

6. A thermosettable, pressure-sensitive adhesive tape comprising a fibrous supporting member coated with a composition comprising (1) 65 to 85 percent of a partially cross-linked saturated polyester resinous material comprising the reaction product of (a) 15 to 30 percent of at least one trihydric saturated aliphatic organic compound containing 3 to 7 carbon atoms per molecule, (b) 15 to 25 weight percent of a hydroxy derivative of benzoic acid, (c) 25 to 40 weight percent of a dehydrated natural oil, and (d) 25 to 40 weight percent of an aromatic dicarboxylic acid, (2) 3 to 8 percent of a butylated malamine-formaldehyde resin, (3) 3 to 10 percent of an epihalohydrin-polyhydric phenol epoxy resin, (4) 3 to 7 percent of a high molecular weight hydroxy reactive natural oil flexibilizer and (5) 1 to 4 percent of an antioxidant operative to prevent oxidation of the natural oil flexibilizer.

7. The adhesive tape of claim 6 wherein the trihydric saturated aliphatic compound is glycerol, the hydroxy derivative of benzoic acid is salicylic acid, the dehydrated natural oil is castor oil and the aromatic dicarboxylic acid is isophthalic acid.

8. The adhesive tape of claim 7 wherein the natural oil flexibilizer is selected from the group of oils consisting of castor oil and soybean oil and the antioxidant is polymerized trimethyl dihydroquinoline.

9. The adhesive tape of claim 6 wherein the coating composition is combined with about 20 to 40 percent of a finely divided mineral filler, based on the solids content of the combination.

10. The adhesive tape of claim 6 wherein the supporting member is comprised of glass fibers.

11. An electrical conductor wrapped with a cured adhesive tape of claim 6.

References Cited

UNITED STATES PATENTS

| 2,543,799 | 3/1951 | Palmquist et al. | 260—21 |
| 2,945,829 | 7/1960 | Frost et al. | 260—21 |
| 3,097,183 | 7/1963 | Drubel et al. | 260—31.4 |

DONALD E. CZAJA, Primary Examiner.

LEON J. BERCOVITZ, Examiner.

R. W. GRIFFIN, Assistant Examiner.